United States Patent Office 2,698,863
Patented Jan. 4, 1955

2,698,863

PERESTERS OF OXO-SUBSTITUTED POLY-PEROXYCARBOXYLIC ACIDS

Frank H. Dickey, Berkeley, Calif., assignor to Shell Development Company, Emeryville, Calif., a corporation of Delaware No Drawing. Application January 18, 1952,
Serial No. 267,203

13 Claims. (Cl. 260—453)

This invention relates to a new class of organic compounds. More particularly, the invention relates to a new class of organic peresters, and to their utilization, particularly as polymerization catalysts.

Specifically, the invention provides new organic compounds having unexpected superior properties as polymerization catalysts comprising peresters, and particularly the tertiary-alkyl peresters, of oxo-substituted polyperoxypolycarboxylic acids wherein the oxo group in the acid molecule is in the alpha or beta position relative to one of the peroxy carboxyl groups.

This application is a continuation-in-part of my application Ser. No. 715,132, filed December 9, 1946, now abandoned.

It is known that vinyl monomers, such as vinyl chloride, may be polymerized in the presence of peroxide catalysts, such as benzoyl peroxide, hydrogen peroxide, tert-butyl perbenzoate and ditertiary-butyl diperoxyphthalate. While these catalysts are satisfactory for polymerizing the monomers on a small scale, their use in producing polymers for many commercial applications leaves much to be desired. The known catalysts are, for example, quite ineffective at low temperatures and the reaction must be accomplished at a relatively high temperature to obtain a satisfactory polymerization rate. The use of high temperatures in the polymerization of these monomers is undesirable as it produces polymers having low molecular weights, poor color and form-stability at room temperature, and inferior mechanical properties.

It is an object of the invention, therefore, to provide a new class of polymerization catalysts. It is a further object to provide a new class of perester catalysts that are effective at low reaction temperatures. It is a further object to provide novel organic peresters that can produce, at a fast rate, polymers having excellent physical properties. It is a further object to provide polymerization catalysts that are particularly effective in a slightly alkaline medium. It is a further object to provide novel catalysts that are effective in bulk, suspension or emulsion systems. It is a further object to provide a new class of organic peresters having unique and valuable properties. Other objects and advantages of the invention will be apparent from the following detailed description thereof.

It has now been discovered that these and other objects may be accomplished by the novel compounds of the invention comprising peresters, and particularly the tertiary-alkyl peresters, of oxo-substituted polyperoxypolycarboxlic acids wherein the oxo group in the acid molecule is in the alpha or beta position relative to one of the peroxy carboxyl groups. These peresters are particularly superior catalysts for the polymerization of vinyl monomers as they are able to initiate polymerization at a very fast rate even at the relatively low reaction temperatures. Thus, while the conventional peroxide catalysts described above show little activity at temperatures below about 30° C., the aforedescribed special group of peresters are quite active at temperatures as low as 20° C. to —10° C. and form high yields of polymers in that temperature range in a very short period. The polymerization of vinyl chloride with the known catalysts, for example, generally requires from 40 to 72 hours to complete at the higher temperatures, but the same degree of polymerization may be accomplished with the above-described novel peresters in the surprisingly short period of 15 minutes at room temperature using a much smaller amount of catalyst. In addition, it has been found that the polymers produced by the use of these particular catalysts possess superior properties even though they are formed at a very fast rate.

The high activity of these peresters at the low reaction temperatures can be chiefly attributed to the unique combination of having the oxo group in the alpha or beta position relative to one of the perester groups. While the relationship between the oxo group in these positions and the perester group is not definitely understood, it does endow the compounds with unexpected activity, particularly when the compounds are utilized in a slightly alkaline medium. Other peresters which do not have the oxo group and the perester group in these particular positions, such as di-tertiary butyl diperoxysuccinate, di-tertiary butyl diperoxyphthalate and tertiary butyl perbenzoate, do not possess this unexpected activity as shown in the experiments reported in the examples at the end of the specification.

The novel peresters of the invention require special methods of preparation as described hereinafter, but for clarity they will be described herein and in the appended claims as being theoretically derived from a polyperoxycarboxylic acid and a monohydric alcohol. The novel compounds may be theoretically obtained by esterifying (1) a polyperoxycarboxylic acid having an oxo group, i. e., a

group, in their molecule in the alpha or beta position relative to one of the peroxy carboxyl groups, with (2) a monohydric alcohol. The term "polyperoxypolycarboxylic acid" refers to those acids possessing a plurality, and preferably from 2 to 4 percarboxyl groups, i. e.,

groups. These acids may be aliphatic, aromatic, alicyclic or heterocyclic and may be saturated or unsaturated. The essential oxo group in the acid molecule may be present in one of the said percarboxyl groups, such as in the case of diperoxyoxalic acid and diperoxymalonic acid, or may be present in a keto group, carboxyl group, acyl radical, i. e., a

radical, or ester radical, i. e., a

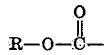

radical. If the acid contains an acyl radical, the said radical may be derived from any carboxylic acid, but is preferably derived from a monocarboxylic acid such as the aliphatic monocarboxlic acids as acetic acid, butyric acid, valeric acid, caproic acid, cyclohexanoic acid, acrylic acid, methacrylic acid, 3,4,4-trimethylhexanoic acid, 2-ethylhexanoic acid, pelargonic acid, stearic acid, lauric acid, and cyclopentanoic acid, and the aromatic acids, such as benzoic acid, isopropylbenzoic acid, toluic acid, chlorobenzoic acid, and vinyl benzoic acid. If the acids contain simple ester radicals, the said radicals may be obtained by the esterification of one or more of the carboxyl groups in the acid molecule with any type of alcohol, such as saturated and unsaturated, aliphatic and alicyclic alcohols, phenols, and the like, as methyl alcohol, ethyl alcohol, butyl alcohol, amyl alcohol, octyl alcohol, decanol, tetradecanol, allyl alcohol, methallyl alcohol, cyclohexanol, cyclohexenol, phenol, benzyl alcohol, chlorobutanol, and cyanohexenol.

The above-described oxo-substituted polyperoxycarboxylic acids may be exemplified by the following: diperoxyoxalic acid, diperoxymalonic acid, diperoxybutylmalonic acid, diperoxydecylmalonic acid, diperoxydodecylmalonic acid, alpha-acetyldiperoxymalonic acid, alpha-butyryldiperoxysuccinic acid, alpha-benzoyldiperoxyadipic acid, alpha-acetyltriperoxy-1,5,10-dodecanetricarboxylic acid, alpha-acrylyldiperoxyglutaric acid, alpha-oleoyldiperoxysuberic acid, alpha-succinyldiperoxyglutaconic acid, alpha-carbomethoxydiperoxysuccinic acid, alpha-carboethoxydiperoxyadipic acid, alpha-carbobutoxydiperoxyglutaconic acid, alpha-carbohexoxydiperoxyhydromuconic acid, alpha-carbodecoxytriperoxy-1,4,6-octanetricarboxylic acid, alpha-keto-diperoxysuccinic acid, alpha-keto-diperoxyglutaric acid, alpha-keto-diperoxysebacic acid, alpha-keto-diperoxyglutaconic acid, beta-keto-diperoxydodecanedioic acid, beta-keto-diperoxy-4-octenedioic acid, beta-keto-diperoxyhendecanedioic acid, and beta,delta-diketo-diperoxydodecanedioic acid.

Preferred oxo-substituted peroxycarboxylic acids used in the theoretical production of the novel peresters comprise diperoxyoxalic acid, diperoxymalonic acid, the diperoxyalkylmalonic acids, the alpha-keto-substituted diperoxydicarboxylic acids wherein the two percarboxyl groups are separated by at least one carbon atom, the beta-keto-substituted diperoxydicarboxylic acids wherein the two percarboxyl groups are separated by at least two carbon atoms, the alpha-acyl substituted diperoxydicarboxylic acids wherein the two percarboxyl groups are separated by at least one carbon atom, and the alpha-carboalkoxy substituted diperoxydicarboxylic acids wherein the two percarboxyl groups are separated by at least one carbon atom, the alpha or beta positions referred to above being in relation to one of the percarboxyl groups.

Particularly preferred acids are the members of the group consisting of (1) diperoxymalonic acid, (2) diperoxyoxalic acid, (3) the diperoxyalkylmalonic acids wherein the alkyl radical contains from 1 to 14 carbon atoms, (4) the alpha-keto-substituted diperoxyalkanedioic acids containing from 3 to 12 carbon atoms and having the two percarboxyl groups separated by at least one carbon atom, (5) the beta-keto-substituted diperoxyalkanedioic acids containing from 4 to 12 carbon atoms and having the two percarboxyl groups separated by at least two carbon atoms, (6) the alpha-alkylcarbonyl substituted diperoxyalkanedioic acids containing from 1 to 8 carbon atoms in the alkylcarbonyl radical and from 3 to 12 carbon atoms in the rest of the acid molecule and having the two percarboxyl groups separated by at least one carbon atom, and (7) the alpha-carboalkoxy substituted diperoxyalkanedioic acids containing from 1 to 8 carbon atoms in the carboalkoxy radical and from 3 to 12 carbon atoms in the rest of the acid molecule and having the two percarboxyl groups separated by at least one carbon atom. The term "alkylcarbonyl" radical used in the above description refers to the

radicals wherein R is an alkyl radical.

The alcohol portion of the novel peresters of the invention may be derived from any monohydric alcohol but is preferably derived from the tertiary monohydric alcohols, i. e., alcohols possessing a tertiary carbon atom, preferably attached directly to the hydroxyl group. Examples of such alcohols are tertiary butanol, tertiary hexanol, tertiary octanol, tertiary decanol, diphenylethylcarbinol, triphenylcarbinol, phenyldibutylcarbinol, chlorophenylethylbutylcarbinol, cyclohexyldiphenylcarbinol, and cyclopentyldimethylcarbinol. Particularly preferred alcohols are the tertiary monohydric alcohols containing from 4 to 18 carbon atoms. Especially preferred are the tertiary alkanols containing from 4 to 10 carbon atoms.

The novel peresters of the invention are theoretically obtained by esterifying at least two of the percarboxyl groups of the above-described polyperoxycarboxylic acids with one or more of the above-described alcohols. Examples of the novel peresters of the invention are di-tertiary butyl diperoxyoxalate, di-tertiary butyl diperoxymalonate, di-tertiary butyl diperoxydecylmalonate, tertiary butyl tertiary amyl diperoxyoctylmalonate, di-tertiary hexyl alpha-ketodiperoxysuccinate, di-(dimethylbenzyl) alpha-ketodiperoxyadipate, di-tertiary octyl alpha-ketodiperoxyglutaconate, di-tertiary hexyl beta-ketodiperoxysebacate, di-tertiary nonyl beta-ketodiperoxybrassylate, di-(dibutylbenzyl) alpha-acetyldiperoxysuccinate, di-(triphenylcarbinyl) alpha-acrylyldiperoxyglutarate, di-tertiary nonyl alpha-oleoyldiperoxysuccinate, di-(dibutylbenzyl) alpha-succinyldiperoxyglutaconate, di-tertiary octyl alpha-carboethoxydiperoxyadipate, di-tertiary butyl alpha-carbobutoxydiperoxysuccinate, di-tertiary amyl alpha-carbohexoxydiperoxy-4-octenedioate, and di-nonyl alpha-carbohexoxydiperoxydodecanedioate.

The preferred peresters of the invention, i. e., those theoretically derived from the above-described preferred acids and the preferred tertiary monohydric alcohols containing from 4 to 18 carbon atoms, may be exemplified by di-tertiary butyl diperoxyoxalate, di-tertiary dodecyl diperoxymalonate, di-tertiary butyl diperoxydodecylmalonate, di-tertiary nonyl alpha-ketodiperoxysuccinate, di-(alpha,alpha-dimethylbenzyl) alpha - acetyldiperoxysuccinate, di-(alpha,alpha-dibutylbenzyl) alpha-carboethoxydiperoxysuccinate, and di-tertiary butyl alpha-acetyldiperoxyfumarate.

The above-described peresters cannot be obtained by direct esterification of a peracid with an alcohol as the hydroxy group of the water of esterification must come from the acid and not the alcohol. Special methods must, therefore, be employed for the preparation of these particular compounds. The more preferred method comprises reacting a hydroperoxide with the desired acyl halide in the presence of an alkali.

The preferred hydroperoxides to be used in this process are those derived from the above-described tertiary monohydric alcohols, such as tertiary-butyl hydroperoxide, tertiary-amyl hydroperoxide, diphenyl-methylcarbinyl hydroperoxide, 5-butyl-5-hydroperoxy-decane, dimethylbenzyl hydroperoxide, cyclohexyldiphenylcarbinyl hydroperoxide, and cyclopentyldimethylcarbinyl hydroperoxide.

The acyl halides used in the process may be exemplified by oxalyl chloride, malonyl chloride, methylmalonyl chloride, dodecylmalonyl chloride, alpha-acetylsuccinyl chloride, alpha-butyrylsuccinyl chloride, alpha-carboethoxysuccinyl chloride, alpha-acrylyladipyl chloride, alpha-ketoglutaconyl chloride, beta-ketopimelyl chloride, beta-ketosebacyl chloride, and alpha-benzoylsuccinyl chloride.

The alkali employed in the process includes pyridine, sodium or potassium bicarbonate, or sodium hydroxide. A sufficient amount of the alkali should be used to insure that the reaction mixture will be alkaline throughout the reaction, i. e., an excess over that necessary to react with the acyl halide.

The reaction may be conducted in the presence or absence of solvents or diluents. In the case of the more viscous peroxides, inert solvents, such as carbon tetrachloride, heptane, or octane, may advantageously be employed.

The proportions of hydroperoxide and acyl halide employed in the reaction may vary over a considerable range. It is generally desirable to react the acyl halide with at least a chemical equivalent amount of the hydroperoxide. The expression "chemical equivalent amount" as employed throughout the specification and claims refers to the amount of hydroperoxide required to furnish approximately one peroxide group for every acyl group to be reacted. Preferably the acyl halide and hydroperoxide are reacted in chemical equivalent ratios of 1:1 to 1:1.5, respectively.

The reaction is ordinarily conducted in the liquid phase in a vessel equipped with suitable heating or cooling means. Preferably, the reaction is conducted in a batch operation with the hydroperoxide, alkali and solvent, if any, being added first and the acyl halide being added in small quantities over a period of time. The reaction temperature will vary somewhat with the reactants. In some instances the reaction proceeds at a rapid rate at temperatures as low or lower than 0° C., while in other cases it may be necessary to raise the temperature to 80° C., or above to obtain a satisfactory reaction rate. Preferred temperatures range from 0° C. to 100° C. Atmospheric, superatmospheric, or subatmospheric pressures may be utilized as desired.

The peresters may be recovered from the reaction mixture by any suitable means, such as precipitation, extraction, filtration, fractional distillation, and the like.

The novel peresters of the invention possess many unusual properties which make them particularly useful and valuable in industry. They are valuable, for example, as bleaching agents for flour, etc., as sterilizing agents or components for antiseptic compositions, as driers for oils as linseed and tung oil, and as catalysts for free radical chain reactions, such as the addition of polyhalogenated hydrocarbons to olefins, and various telomerization reactions as disclosed in U. S. Patents No. 2,438,021, No. 2,418,832, and No. 2,440,801.

The novel peresters are especially valuable as catalysts for the polymerization of vinyl monomers. The expression "vinyl monomers" includes all those organic compounds containing at least one $CH_2=C<$ group in their molecule. Examples of these monomers are styrene, alpha-methylstyrene, dichlorostyrene, vinyl naphthalene, vinyl phenol, acrylic acid and the alpha-alkyl substituted acrylic acids; the esters of these unsaturated acids, such as methyl acrylate, methyl methacrylate, butyl methacrylate, and propyl acrylate; the vinylidene halides, such as vinylidene chloride, vinylidene bromide and vinylidene fluoride; the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate; the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether; the vinyl ketones, such as vinyl butyl ketone, and vinyl ethyl ketone; and the allyl derivatives, such as allyl acetate, allyl butyrate, diallyl phthalate, diallyl adiphate, methallyl propionate, allyl chloride, methallyl chloride, ally acrylate, and methallyl methacrylate.

The peresters are also effective as catalysts for the copolymerization of the above-described compounds with other types of polymerizable organic compounds, particularly those containing at least one ethylenic linkage, such as ethylene, the saturated esters of the unsaturated acids, such as diethyl maleate, dibutyl crotonate, and the like.

Polymerization of the vinyl monomers in the presence of the novel peresters may be accomplished by a variety of methods. The polymerization may be accomplished in bulk, in a solvent solution or in an aqueous emulsion or suspension. The peresters usually display their maximum catalytic activity in a mildly alkaline medium so it is usually desirable to accomplish the polymerization in an aqueous emulsion where the desired pH may be easily maintained. In this preferred method the material to be polymerized is added to a mixture containing water, an emulsifying agent, a mildly alkaline pH adjuster, and the monoperester catalyst, and the resulting mixture maintained at the desired temperature and pressure.

Emulsifying agents that may be employed in the preferred process include the soaps, such as sodium and potassium myristate, laurate, palmitate, oleate, stearate, rosinate and hydroabietate; the alkali metal alkyl or alkylene sulfates, such as sodium lauryl sulfate, potassium stearyl sulfate; the alkali metal alkyl or alkylene sulfonates, such as sodium lauryl sulfonates, potassium stearyl sulfonate, and sodium cetyl sulfate; sulfonated mineral oil, as well as the ammonium salts thereof; and salts of high amines like lauryl amine hydrochloride, and stearyl amine hydrobromide. The amount of the emulsifying agent employed will generally vary between about 0.1% and 6% by weight of the monomer, preferably between 0.1% and 2% by weight of the monomer.

The desired alkalinity may be maintained by the addition of alkaline pH adjusters, such as trisodium phosphate, sodium carbonate, sodium bicarbonate, tetrasodium pyrophosphate, disodium hydrogen phosphate and calcium carbonate.

The temperature employed in the polymerization may vary over a considerable range. The advantages of using the novel peresters as catalysts are more evident, however, when the relatively low temperatures are employed. The use of temperatures as low or lower than −10° C. gives very satisfactory polymerization rates and produces polymers having the desired superior physical properties. Preferred temperatures range from 0° C. to 50° C. Atmospheric, superatmospheric or subatmospheric pressures may be employed as desired.

The polymers formed during the above-described polymerization process may be recovered from the polymerization medium by conventional means, such as addition of electrolytes, solvents, freezing, dehydration, and the like.

The resulting polymers are substantially colorless products possessing relatively high molecular weights. Plasticized specimens of the polymers possess excellent color and increased tensile strength and flexibility and may be utilized for a variety of commercial applications, such as the formation of rigid plastic articles of various shapes and sizes, surface coating compositions, impregnating agents, and the like.

To illustrate the manner in which the invention may be carried out the following examples are given. It is to be understood, however, that the examples are for the purpose of illustration and the invention is not to be regarded as limited to any of the specific conditions cited therein. Unless otherwise specified, parts described in the examples are parts by weight.

In order to conserve space in some of the tables shown in the following examples, the peresters have been described only with the prefix "per" instead of "peroxy." Thus, di-tert-butyl diperoxymalonate has sometimes been referred to as di-tert-butyl dipermalonate. It should thus be understood that the compounds referred to herein by the names containing the prefix "per" are the same compounds as those given the same name but with the prefix "peroxy."

*Example 1*

Seven parts (0.05 mole) of malonyl chloride was added dropwise over a period of about 30 minutes to a stirred solution composed initially of 1.08 parts (0.12 mole) of anhydrous tertiary-butyl hydroperoxide and 8 parts (0.1 mole) of pyridine in about 100 parts of petroleum ether. The temperature of the solution during the addition was maintained between 5° C. and 10° C. by immersing the reaction vessel in an ice bath. After all the acid chloride was added, the ice bath was removed and the stirring continued for 30 minutes. The water-soluble constituents were removed from the petroleum ether solution by extraction with eight 100 part portions of water. The product was isolated by cooling the petroleum ether solution to the temperature of Dry Ice for one hour and then decanting the ether. The product was a pale yellow liquid having a slight peroxidic odor. Analysis of this material indicated it was di-tertiary-butyl diperoxymalonate. R. I. N 20/D 1.4356.

|  | Found |  | Theory |
|---|---|---|---|
| Percent Carbon | 53.9 | 53.8 | 53.3 |
| Percent Hydrogen | 8.9 | 8.4 | 8.1 |
| M. W. (as oxidizing agent toward HI in acetic acid) | 250 |  | 248 |

The superiority of the di-tertiary-butyl diperoxymalonate produced above as a polymerization catalyst for vinyl monomers over known peroxide catalysts is shown in the following experiments:

(a) Five separate aqueous mixtures were prepared by adding about 100 parts of vinyl chloride to water containing sodium lauryl sulfate. One of the catalysts listed below was added in the amount indicated to each of the separate mixtures and the mixture maintained at a temperature between 40° C. and 50° C. The polymerization time and yield of polymer obtained in each case are given in the table below:

| Catalyst | Amount of Catalyst (PPHM)[1] | Polymerization Time, hrs. | Yield of Polymer, Percent |
|---|---|---|---|
| 1. Di-tertiary-butyl diperoxymalonate | .5 | 1 | 85. |
| 2. Di-tertiary-butyl diperoxymalonate | 0.25 | 1 | 100. |
| 3. Di-tertiary-butyl diperoxyphthalate | .5 | 23.5 | Negligible amount. |
| 4. Di-tertiary-butyl diperoxysuccinate | 0.25 | 24 | 5. |
| 5. Benzoyl peroxide | 4 | 77 | 81. |
| 6. Diacetyl peroxide | 2 | 56 | 78. |
| 7. Tert-butyl perbenzoate | 2 | 46 | 27. |

[1] PPHM=parts per 100 parts of monomer.
1, 3 and 4=400 water, 1 part-1 sodium lauryl sulfate (SLS), 0.5 part trisodium phosphate.
2=400 water-1 part SLS, .25 part $NaHSO_3$.
5=210 parts water, 2 parts SLS.
6 and 7=300 parts water, 2 parts SLS.

A comparison of the above polymerization times and yields clearly indicates the unexpected increase in rate of polymerization that is obtained by using the novel oxo-substituted peresters over the known peroxide type catalysts and other peresters, such as di-tertiary butyl peroxysuccinate and di-tertiary butyl diperoxyphthalate, which do not have the oxo group in the critical alpha or beta positions.

(b) The high rate of reaction that is obtained with the novel peresters at the lower temperatures is shown in the following experiment: Three separate aqueous mixtures were prepared by adding about 100 parts of vinyl chloride to water containing a dispersing or emulsifying agent. The catalysts listed below were added in the indicated amount to each of the separate mixtures and the mixture maintained at 20° C. The polymerization time and yield of polymer obtained in each case are given in the table below:

| Catalyst | Amount of Catalyst (PPHM)[1] | Polymerization Time, hrs. | Yield of Polymer, Percent |
| --- | --- | --- | --- |
| 1. Di-tert-butyl diperoxymalonate. | 0.25 | 1.6 | 98. |
| 2. Di-tert-butyl dipermalonate. | 0.25 | .25 | 95. |
| 3. Di-tert-butyl diperoxysuccinate. | .5 | 24 | Negligible amount. |
| 4. Di-tert-butyl diperoxyphthalate. | .5 | 24 | Do. |

[1] PPHM = parts per 100 parts of monomer.
1, 3 and 4 = 400 parts water, 2 parts Aerosol OT (dioctyl sulfosuccinate).
2 = 400 water, 1 part SLS, and 0.5 part trisodium phosphate.

Even though the polymer was produced at a very fast rate in experiments 1 and 2 shown in the table above, the products still have very good physical properties. Some of the properties of the polymer formed in experiment 2 are shown in the table below:

| Mol. Weight | Tensile Strength | Ultimate Elongation | 100% Modulus |
| --- | --- | --- | --- |
| about 143,000 | 2,340 p. s. i. | 205% | 1,820 p. s. i. |

(c) The superiority of the novel oxo-substituted peresters in bulk polymerization is shown in the following experiment: About 100 parts of methyl methacrylate and styrene were placed in separate tubes with 1 part of catalyst described below. One set of tubes was placed in a room maintained at 25° C. and another set placed in a room maintained at 43° C. The time taken for each sample to attain sufficient polymer concentration to become non-flowing is indicated below:

| Monomer | Catalyst | Setting up Time (hrs.) 25° C. | Setting up Time (hrs.) 43° C. |
| --- | --- | --- | --- |
| Methyl methacrylate. | Benzoyl peroxide | 24 | 8 |
| | Tert-butyl perbenzoate | 168 | 29 |
| | Di-tert-butyl dipermalonate | 5 | 3 |
| Styrene | Benzoyl peroxide | 730 | 165 |
| | Tert-butyl perbenzoate | 1,850 | 315 |
| | Di-tert-butyl dipermalonate | 48 | 21 |

(d) The superiority of the novel catalysts of the invention in a slightly alkaline medium is shown in the following experiment: Methyl methacrylate, methacrylonitrile and styrene were polymerized in separate mildly alkaline aqueous emulsions in the presence of the perester catalyst indicated below. The polymerization mixture in each case was made up of 100 parts monomer, 0.5 part catalyst, 1 part sodium lauryl sulfate, 0.5 part sodium bicarbonate and 300 parts water. The polymerization was conducted at 43° C. The results obtained in each case are indicated in the table below:

| Monomer | Catalyst | Polymerization Time, (hrs.) | Percent Polymerized |
| --- | --- | --- | --- |
| Methyl methacrylate. | Benzoyl peroxide | .5 | 1 |
| | Tert-butyl perbenzoate | .5 | 0 |
| | Di-tert-butyl di-permalonate. | .3 | 94 |
| Methacrylonitrile | Benzoyl peroxide | 6.5 | 2 |
| | Tert-butyl perbenzoate | 6.5 | 0 |
| | Di-tert-butyl dipermalonate. | 6.5 | 23 |
| Styrene | Benzoyl peroxide | 1.0 | 1 |
| | Tert-butyl perbenzoate | 1.0 | 1 |
| | Di-tert-butyl dipermalonate. | 1.0 | 93 |

Example II

A solution containing 4.4 parts (0.05 mole) oxalyl chloride in 15 parts of petroleum ether was added with cooling and stirring to 75 parts of a petroleum ether solution containing 12 moles of tertiary butyl hydroperoxide and 11 moles of pyridine. Cooling and stirring was continued for about 5 minutes after the addition was completed. At that time, 50 parts of water was added and the solution shaken causing the formation of two phases. The phases were separated and the upper phase was washed again with 50 parts of water and dried over anhydrous sodium sulfate. The solvent was evaporated off and a white crystalline peroxide was obtained. Analysis indicated that it was di-tertiary-butyl diperoxyoxalate.

The di-tertiary-butyl diperoxyoxalate produced above is able to initiate polymerization of vinyl monomers, such as vinyl chloride and methyl methacrylate at a very fast rate at temperatures as low as 20° C. At 20° C. a system containing 100 parts of vinyl chloride, 400 parts of water, 1 part sodium lauryl sulfate and 0.5 part trisodium phosphate, and 0.25 part di-tertiary-butyl diperoxyoxalate produces a yield of polymer over 8 times as large as that produced from a similar system at 20° C. containing 0.25 part di-tertiary-butyl diperoxysuccinate during the same period.

Example III

Seven parts of dodecylmalonyl chloride was added dropwise over a period of about 30 minutes to a stirred solution composed initially of 0.12 mole of anhydrous tertiary-butyl hydroperoxide and 9 parts of pyridine in 100 parts of petroleum ether. The temperature of the solution during the addition was maintained between 5 and 10° C. by immersing the reaction vessel in an ice bath. After all the acid chloride was added, the ice bath was removed and the stirring continued for 30 minutes. The water-soluble constituents were removed from the petroleum ether solution by extracting with eight 100 part portions of water. The product was isolated by cooling the petroleum ether solution to the temperature of Dry Ice for one hour and then decanting the ether. The product was a crystalline solid. Analysis of the material showed it to be di-tertiary-butyl diperoxydodecylmalonate.

| | Found | Theory |
| --- | --- | --- |
| C, Percent | 66.1 | 66.3 |
| H, Percent | 10.9 | 10.6 |

The di-tertiary-butyl diperoxydodecylmalonate produced above shows high activity in polymerizing vinyl monomers, such as styrene, methyl methacrylate and acrylonitrile, at low temperatures.

Example IV

A solution containing 10.55 parts of beta-ketopimelyl chloride in petroleum ether is added with cooling and stirring to 150 parts of a petroleum ether solution containing 11 parts of tertiary butyl hydroperoxide and 10 parts of pyridine. Cooling and stirring is continued for about 5 minutes after the addition is completed. At that time, 50 parts of water is added and the solution shaken causing the formation of two phases. The phases are separated and the upper phase washed and dried over anhydrous sodium sulfate. The solvent is evaporated and the resulting product identified as di-tertiary-butyl beta-keto-diperoxypimelate.

The di-tertiary-butyl beta-ketodiperoxypimelate produced above shows high activity in polymerizing vinyl chloride and styrene, particularly when employed in an alkaline medium.

Example V

About 0.05 mole of alpha-acetylsuccinyl chloride is added dropwise over a period of about 40 minutes to a stirred solution composed initially of 0.1 mole of anhydrous tert-amyl hydroperoxide and 0.1 mole of pyridine in about 150 parts of petroleum ether. The temperature of the solution during the addition is maintained between 5° C. and 10° C. by immersing the flask in an ice bath. After all the acid chloride is added, the bath is removed and the stirring continued for about one hour.

The water-soluble components are removed by extracting with ten 50 part portions of water. The product, di-tertiary-amyl alpha-acetyldiperoxysuccinate, is isolated by cooling the petroleum ether solution to the temperature of Dry Ice and then decanting the ether.

The di-tertiary-amyl alpha-acetyldiperoxysuccinate produced above is particularly active as a polymerization catalyst at the low reaction temperatures for monomers, such as vinyl chloride, styrene, and methyl methacrylate.

Peresters having related properties may be obtained by replacing the alpha-acetylsuccinyl chloride in the above process with equivalent amounts of each of the following chlorides: alpha-butyryladipyl chloride, alpha-benzoylglutaryl chloride and alpha-acetylglutaconyl chloride.

*Example VI*

To a suspension containing 33 parts (0.1 mole) of 53% sodium alpha,alpha-dimethylbenzyl hydroperoxide in petroleum ether is added 7 parts (0.05 mole) of malonyl chloride. The mixture is allowed to stand at room temperature for one hour with occasional stirring. At the end of this time the solution is washed with water and with two successive portions of 5% aqueous sodium bicarbonate. The solution is dried over anhydrous sodium sulfate and the solvent removed by evaporation at reduced pressure to yield di-(alpha,alpha-dimethylbenzyl) diperoxymalonate.

Peresters having related properties may be obtained by replacing the malonyl chloride in the above process with equivalent amounts of each of the following chlorides: oxalyl chloride, octylmalonyl chloride, and butylmalonyl chloride.

*Example VII*

About 10.55 part (0.05 mole) of alpha-carbomethoxysuccinyl chloride is added dropwise to a stirred solution composed initially of 12.48 (0.12 mole) parts of anhydrous tert-amyl hydroperoxide and 10 parts of pyridine in about 150 parts of petroleum ether. The temperature of the mixture was maintained at a low level by immersing the vessel in an ice bath. After all the chloride is added, the ice bath is removed and the stirring continued for about 30 minutes. The water-soluble constituents are removed from the petroleum ether solution by extracting with eight 100 part portions of water. The product, di-tertiary-amyl alpha-carbomethoxydiperoxysuccinate, is isolated by cooling the petroleum ether solution to the temperature of Dry Ice for one hour and then decanting the ether.

The di-tertiary amyl alpha-carbomethoxydiperoxysuccinate produced above may be used to polymerize vinyl chloride, styrene, acrylonitrile, and methacrylonitrile.

Peresters having related properties may be obtained by replacing the alpha-carbomethoxysuccinyl chloride in the above process with equivalent amounts of each of the following chlorides: alpha-carboethoxysuccinyl chloride, alpha-carbobutoxyadipyl chloride and alpha-carbobutoxysuccinyl chloride.

I claim as my invention:

1. A perester of an oxo-substituted polyperoxycarboxylic acid having an oxo group in the acid molecule not more than one carbon atom removed from one of the peroxycarboxyl groups.
2. A perester of a beta-keto substituted diperoxydicarboxylic acid wherein the keto group is in the beta position relative to one of the peroxycarboxyl groups and the two peroxycarboxyl groups are separated by at least two carbon atoms.
3. A perester of an alpha-alkylcarbonyl substituted diperoxydicarboxylic acid wherein the alkylcarbonyl group is in the alpha position relative to one of the peroxycarboxyl groups and the two peroxycarboxyl groups are separated by at least one carbon atom.
4. A perester of an alpha-carboalkoxy substituted diperoxydicarboxylic acid wherein the carboalkoxy group is in the alpha position relative to one of the peroxycarboxyl groups and the two peroxycarboxyl groups are separated by at least one carbon atom.
5. A tertiary alkyl perester of an oxo-substituted polyperoxycarboxylic acid having an oxo group in the acid molecule not more than one carbon atom removed from one of the peroxycarboxyl groups and containing from 3 to 15 carbon atoms.
6. A compound of the group consisting of (1) ditertiary alkyl diperoxyoxalate, (2) ditertiary alkyl diperoxymalonate, (3) ditertiary alkyl diperoxyalkylmalonate, (4) tertiary alkyl diperesters of alpha-keto substituted diperoxyalkanedioic acids wherein the two peroxycarboxyl groups are separated by at least one carbon atom, (5) tertiary alkyl diperesters of beta-keto substituted diperoxyalkanedioic acids wherein the two peroxycarboxyl groups are separated by at least two carbon atoms, (6) tertiary alkyl diperesters of alpha-alkylcarbonyl substituted diperoxyalkanedioic acids wherein the two peroxycarboxyl groups are separated by at least one carbon atom, and (7) tertiary alkyl diperesters of alpha-carboalkoxy substituted diperoxyalkanedioic acids wherein the two peroxycarboxyl groups are separated by at least one carbon atom, the alpha and beta terms used above being in relation to one of the peroxycarboxyl groups.
7. A ditertiary alkyl diperoxyoxalate.
8. A ditertiary alkyl diperoxymalonate.
9. Ditertiary butyl beta-keto-diperoxyglutarate.
10. Ditertiary butyl alpha-acetyl-diperoxysuccinate.
11. Ditertiary butyl alpha-carboethoxy-diperoxysuccinate.
12. Ditertiary butyl diperoxymalonate.
13. Ditertiary butyl diperoxyoxalate.

References Cited in the file of this patent

UNITED STATES PATENTS

| Number | Name | Date |
|---|---|---|
| 2,524,536 | Nordlander et al. | Oct. 3, 1950 |
| 2,567,615 | Milas | Sept. 11, 1951 |